(No Model.)
A. KRUMHOLZ.
FEED WATER HEATER AND PURIFIER.
No. 461,244. Patented Oct. 13, 1891.
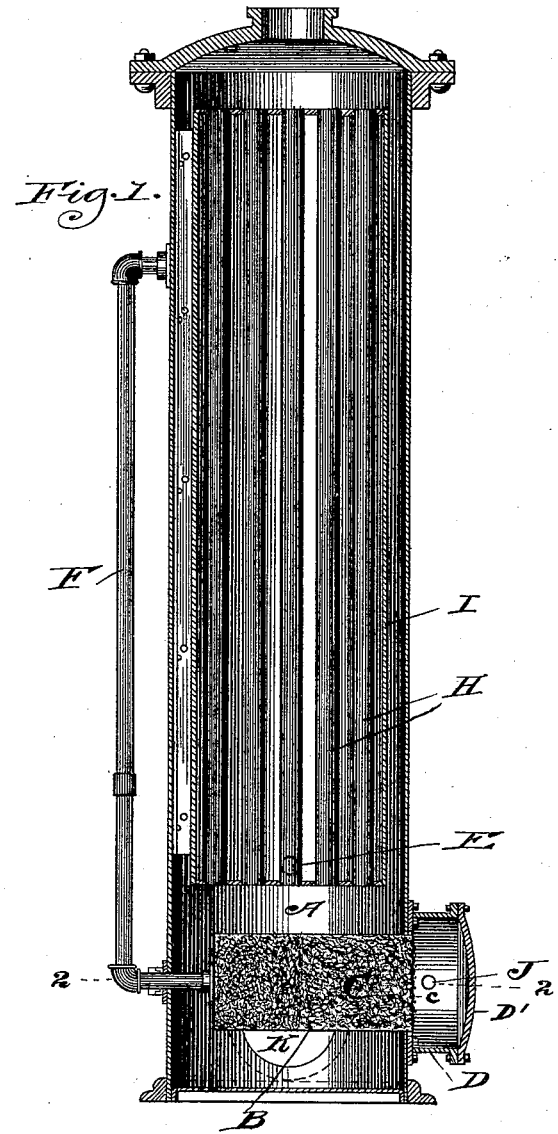
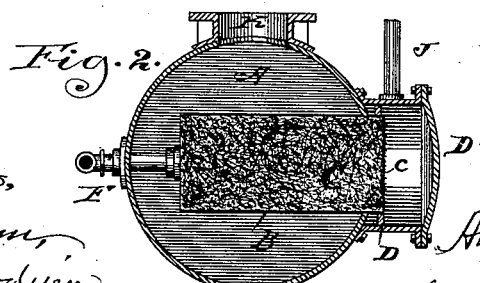

UNITED STATES PATENT OFFICE.

AUGUST KRUMHOLZ, OF CHICAGO, ILLINOIS.

FEED-WATER HEATER AND PURIFIER.

SPECIFICATION forming part of Letters Patent No. 461,244, dated October 13, 1891.

Application filed January 2, 1891. Serial No. 376,462. (No model.)

*To all whom it may concern:*

Be it known that I, AUGUST KRUMHOLZ, a citizen of the United States, residing at Chicago, Illinois, have invented certain new and useful Improvements in Feed-Water Heaters and Purifiers, of which the following is a specification.

Feed-water for steam-boilers is usually heated by the exhaust-steam from an engine; but the use of fluid fuel—such as gas, oil, &c.—for running engines and heating metal is now quite general, and it has been found in many instances where such fuel is employed that much heat is wasted either passing into the stack or being allowed to overheat the walls of the furnace. I propose to utilize this otherwise waste heat in the heating of feed-water for steam-boilers, and to this end I have devised a simple form of feed-water heater and purifier, which can be placed in proximity to a gas-burning furnace and the surplus or waste heat whereof is directed into the heating-chamber of the feed-water heater and there utilized to heat the feed-water.

In carrying out my invention I employ a shell to form a chamber to which the products of combustion—for example, the waste heat from the furnace using hydrocarbon fuel or gas—are delivered. Within this chamber is removably secured a shell containing a filtering material, through which the feed-water is passed. Above the heating-chamber rises a heating-drum having flues in communication with the chamber below, and through which flues the products of combustion pass from said chamber. The feed-water is delivered into the space surrounding these flues from a pump or reservoir, and after becoming heated is passed through the filtering material and led off to the boiler.

In the accompanying drawings, Figure 1 is an elevation sectional through the heater-shell and filtering-chamber, and Fig. 2 is a section below the line 2 2 of Fig. 1.

A represents the heating-chamber, whose walls are made of brick, wrought-iron lined with brick, or cast-iron, as desired. One of the upright walls of this chamber is cut away, and through the aperture a shell B, containing filtering material C, such as excelsior, is projected into the heating-chamber, and the aperture is covered by an annular casting D, with a removable cap or cover D'. The filtering material is confined within the shell B by a perforated diaphragm c, secured by lag-screws.

Water is admitted to the heating-drum through the inlet E, and as it becomes heated it is drawn off from the top of the drum by the pipe F and delivered into the filtering-shell B. The tubes H are in open communication with the heating-chamber below and are inclosed by the shell I. An outlet J for the heated feed-water is tapped into the chamber formed by the annular casting D.

The heating-chamber has an inlet K for the escaping heat from a gas-burning furnace or other source, and when the situation is such that the heater cannot be placed vertically, as shown in the drawings, it may be placed horizontally and the inlet for the heat may be through its bottom wall, which may communicate directly with the fire-box or stack of a furnace. The filtering-shell being within the heating-chamber forms a secondary heating-drum for the feed-water and insures its heating to such a degree as to cause the deposit of its scale-forming impurities and insures its delivery into the boiler at a high temperature.

If it be desired to remove the filtering material, the cap D' may be taken off, so as to expose the screen or perforated diaphragm c, which is then removed.

I claim—

1. A feed-water heater and purifier comprising, in combination, a chamber to which the surplus of waste heat from the furnace is admitted and wherein is secured a shell containing a filtering material, a heating-drum having flues in communication with the heating-chamber, and suitable pipes for delivering the water to the filtering material, conducting it thence to the heating-chamber, and thence to the place of use, substantially as described.

2. A feed-water heater and purifier comprising, in combination, a chamber having an opening in its wall and a removable cap or cover for said opening, a shell containing a filtering material secured within the chamber and adapted to be removed through the aperture, a heating-drum having flues in communication with the chamber, and suitable pipes for delivering the water to the filtering material, conducting it thence to the heating-drum, and thence to the place of use, substantially as described.

AUGUST KRUMHOLZ.

Witnesses:
FREDERICK C. GOODWIN,
N. M. BOND.